(12) United States Patent
Inoue et al.

(10) Patent No.: US 7,994,684 B2
(45) Date of Patent: Aug. 9, 2011

(54) AUTOMOTIVE ALTERNATING-CURRENT GENERATOR

(75) Inventors: Masaya Inoue, Tokyo (JP); Kouki Naka, Tokyo (JP); Hiroyuki Akita, Tokyo (JP); Kanji Shinkawa, Tokyo (JP); Yoshinori Miyamoto, Tokyo (JP); Toshiyuki Yoshizawa, Tokyo (JP); Haruyuki Kometani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 146 days.

(21) Appl. No.: 12/376,969

(22) PCT Filed: Aug. 22, 2007

(86) PCT No.: PCT/JP2007/066264
§ 371 (c)(1),
(2), (4) Date: Feb. 10, 2009

(87) PCT Pub. No.: WO2008/029623
PCT Pub. Date: Mar. 13, 2008

(65) Prior Publication Data
US 2010/0164317 A1   Jul. 1, 2010

(30) Foreign Application Priority Data
Sep. 1, 2006 (JP) .................... 2006-238054

(51) Int. Cl.
*H02K 1/22* (2006.01)
*H02K 21/12* (2006.01)
*H02K 1/00* (2006.01)

(52) U.S. Cl. .......... 310/263; 310/156.66; 310/156.67; 310/156.69; 310/156.71; 310/179; 310/181; 310/261.1

(58) Field of Classification Search .................. 310/156.66–156.73, 179, 181, 261, 263, 261.1
See application file for complete search history.

(56) References Cited

U.S. PATENT DOCUMENTS
6,707,227 B1 * 3/2004 York et al. .................. 310/263
(Continued)

FOREIGN PATENT DOCUMENTS
JP 58 49579 4/1983
JP 60 26444 2/1985
JP 4 12652 1/1992

OTHER PUBLICATIONS
U.S. Appl. No. 12/444,975, filed Apr. 9, 2009, Inoue, et al.
(Continued)

*Primary Examiner* — Quyen Leung
*Assistant Examiner* — Jose A Gonzalez Quinones
(74) *Attorney, Agent, or Firm* — Oblon, Spivak, McClelland, Maier & Neustadt, L.L.P.

(57) ABSTRACT

An automotive generator that includes a Lundell rotor. First and second protruding portions are disposed so as to project from inner wall surfaces of portions of first and second yoke portions at root portions of first and second claw-shaped magnetic pole portions, and first and second recess portions are recessed into inner wall surfaces of portions of the first and second yoke portions that face the second and first protruding portions. In addition, a shape of a region in which the field coil is disposed is configured into a wave shape that has a cross-sectional shape in a plane that includes a central axis of the pole core that is approximately constant in a circumferential direction and that zigzags alternately in an axial direction at positions of each of the first and second claw-shaped magnetic pole portions.

6 Claims, 8 Drawing Sheets

U.S. PATENT DOCUMENTS

| | | | |
|---|---|---|---|
| 2003/0137208 A1* | 7/2003 | York et al. | 310/194 |
| 2007/0267936 A1* | 11/2007 | York | 310/263 |
| 2008/0315701 A1 | 12/2008 | Inoue et al. | |
| 2009/0009021 A1 | 1/2009 | Shinkawa et al. | |
| 2009/0066175 A1 | 3/2009 | Morita et al. | |

OTHER PUBLICATIONS

U.S. Appl. No. 12/670,917, filed Jan. 27, 2010, Yoshizawa, et al.
U.S. Appl. No. 12/812,844, filed Jul. 14, 2010, Yoshizawa, et al.
U.S. Appl. No. 12/921,319, filed Sep. 7, 2010, Inoue, et al.

* cited by examiner

AUTOMOTIVE ALTERNATING-CURRENT GENERATOR

TECHNICAL FIELD

The present invention relates to an automotive generator that has a Lundell rotor, and particularly relates to a rotor construction that can alleviate magnetic saturation in a root portion of a claw-shaped magnetic pole portion, suppress increases in leakage flux, and ensure sufficient magnetic flux to a claw tip portion.

BACKGROUND ART

A Lundell rotor includes; a rotor core that has; a cylindrical boss portion; a pair of yoke portions that are disposed so as to extend radially outward from two axial end edge portions of the boss portion; and claw-shaped magnetic pole portions that are disposed so as to extend axially from each of the pair of yoke portions and intermesh with each other; and a field coil that is mounted inside a field coil housing space that is surrounded by the boss portion, the yoke portions, and the claw-shaped magnetic pole portions.

Now, it is necessary to increase the cross-sectional area of the claw-shaped magnetic pole portions in order to pass sufficient magnetic flux to the claw-shaped magnetic pole portions. On the other hand, when the cross-sectional area of the claw-shaped magnetic pole portions is increased, areas of circumferential side surfaces of the claw-shaped magnetic pole portions are also increased. Areas of adjacent claw-shaped magnetic pole portions that face each other circumferentially thereby increase, increasing magnetic leakage flux. Thus, in order to maintain a balance between the two, the claw-shaped magnetic pole portions are made to have a tapered shape such that cross-sectional area is sequentially reduced from a base portion to a tip end portion (see Patent Literature 1, for example).

Patent Literature 1: Japanese Patent Laid-Open No. SHO 60-26444 (Gazette)

DISCLOSURE OF THE INVENTION

Problem to be Solved by the Invention

In conventional rotors, the magnetic path cross-sectional area of the root portions of the claw-shaped magnetic pole portions could not be increased very much since the pair of yoke portions are formed so as to have positional relationships that are symmetrical relative to an axial center of the rotor core and mounting space must be reserved for the field coil. For this reason, some problems have been that magnetic flux density in the root portions of the claw-shaped magnetic pole portions is high, and magnetic flux cannot reach the tip end portions of the claw-shaped magnetic pole portions satisfactorily.

In view of these conditions, the present applicants have focused on the fact that reducing axial thickness of a portion between the claw-shaped magnetic pole portions of the respective yoke portions does not lead to magnetic resistance increases in magnetic circuits in the rotor and have succeeded in inventing the present invention. Specifically, in conventional rotors, alleviation of magnetic saturation at the root portions and reductions in magnetic leakage flux in a circumferential direction are realized by forming the pair of yoke portions that are disposed so as to extend radially outward from the two axial end edge portions of the boss portion so as to have ring shapes that have identical axial thickness and giving the claw-shaped magnetic pole portions a tapered shape. The present invention is based on a totally different technical concept from conventional techniques and increases the magnetic path cross-sectional area of a root portion of a claw-shaped magnetic pole portion while maintaining mounting space for the field coil by increasing the cross-sectional area of a portion of a yoke portion at the root portion of the claw-shaped magnetic pole portion, and reducing the cross-sectional area of a portion of the yoke portion at a second end that faces the root portion of the claw-shaped magnetic pole portion by an amount proportionate to that increase in cross-sectional area.

The present invention aims to solve the above problems and an object of the present invention is to provide an automotive generator that includes a Lundell rotor that can increase magnetic path cross-sectional area of a root portion of a claw-shaped magnetic pole portion while ensuring mounting space for a field coil, alleviate magnetic saturation in the root portion of the claw-shaped magnetic pole portion, and ensure sufficient magnetic flux to a claw tip portion, by increasing cross-sectional area of a portion of a yoke portion at the root portion of the claw-shaped magnetic pole portion, and reducing cross-sectional area of a portion of a yoke portion that faces the root portion of the claw-shaped magnetic pole portion.

Means for Solving the Problem

In order to achieve the above object, according to one aspect of the present invention, there is provided an automotive generator including: a rotor having: a pole core having: a columnar boss portion; a pair of yoke portions that are disposed so as to extend radially outward from two axial end edge portions of the boss portion; and a plurality of claw-shaped magnetic pole portions that are disposed so as to extend axially from each of the pair of yoke portions, and that intermesh with each other, the pole core being fixed to a shaft that is inserted through a central axial position of the boss portion; and a field coil that is housed inside a field coil housing space that is surrounded by the boss portion, the pair of yoke portions, and the claw-shaped magnetic pole portions. Protruding portions are disposed so as to project from inner wall surfaces of portions of the yoke portions at root portions of each of the claw-shaped magnetic pole portions, and recess portions are recessed into inner wall surfaces of portions of the yoke portions that face the protruding portions. In addition, a shape of a region in which the field coil is disposed is configured into a wave shape that has a cross-sectional shape in a plane that includes a central axis of the pole core that is approximately constant in a circumferential direction and that zigzags alternately in an axial direction at positions of each of the claw-shaped magnetic pole portions.

EFFECTS OF THE INVENTION

According to the present invention, because the protruding portions are disposed so as to project from the inner wall surfaces of portions of the yoke portions at root portions of each of the claw-shaped magnetic pole portions, magnetic path cross-sectional area in the root portions of the claw-shaped magnetic pole portions is increased, alleviating magnetic saturation in the root portions of the claw-shaped magnetic pole portions, thereby enabling sufficient magnetic flux to be ensured to the claw tip portion. Because the protruding portions and the recess portions are formed facing inner wall surfaces of the pair of yoke portions, mounting space for the field coil can be kept constant. In addition, because the recess portions are positioned between circumferentially adjacent claw-shaped magnetic pole portions, magnetic resistance is not increased in the magnetic circuit.

BEST MODE FOR CARRYING OUT THE INVENTION

Embodiment 1

Figure 1:
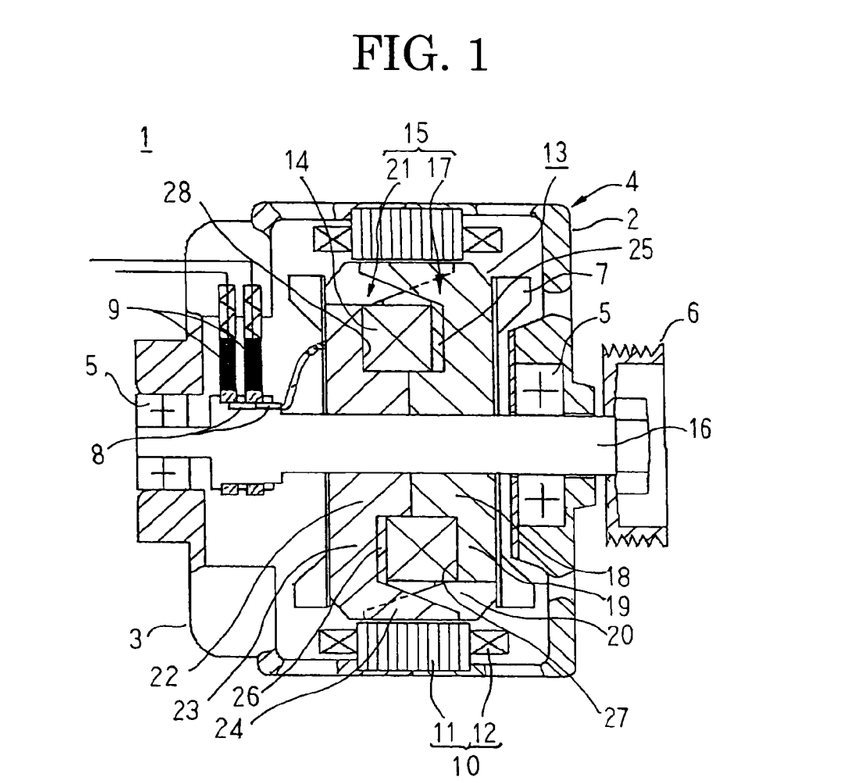
FIG. 1 is a cross section that schematically shows a configuration of an automotive generator according to Embodiment 1 of the present invention.
Figure 2:
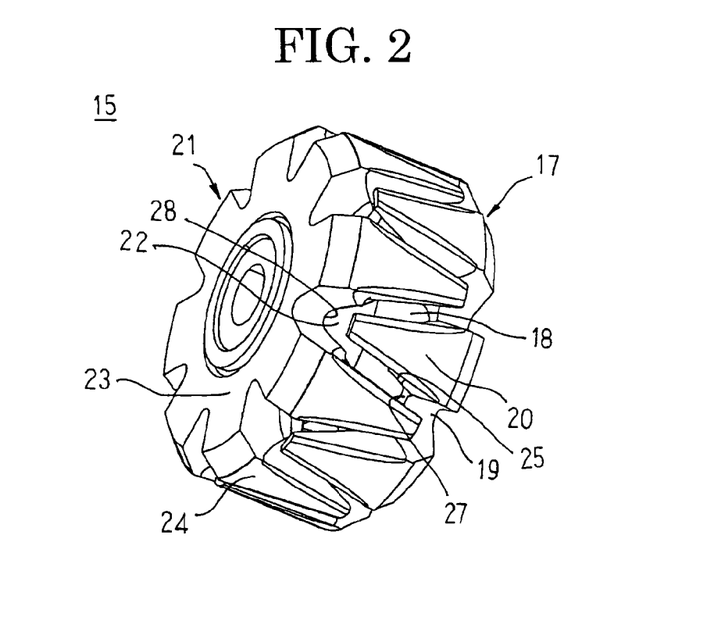
FIG. 2 is a perspective that shows an assembled state of a rotor core in a rotor of the automotive generator according to Embodiment 1 of the present invention.
Figure 3:
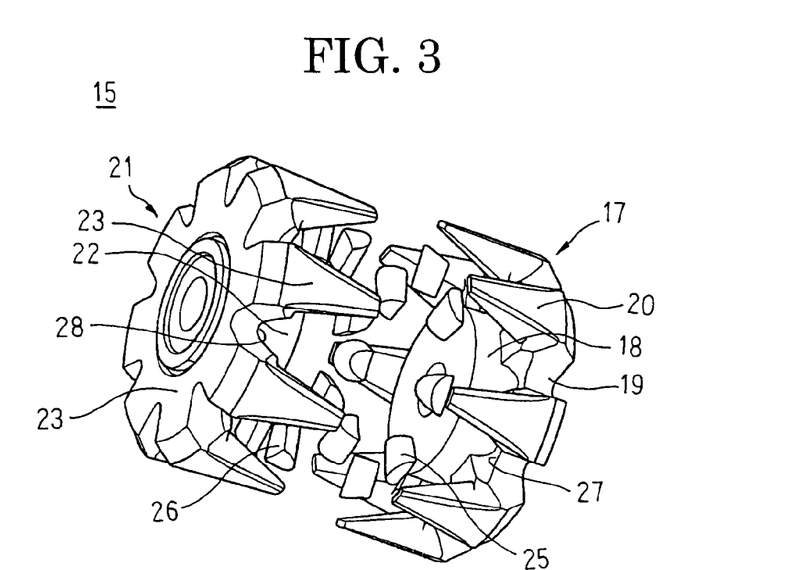
FIG. 3 is an exploded perspective that shows the rotor core in the rotor of the automotive generator according to Embodiment 1 of the present invention.
Figure 4:
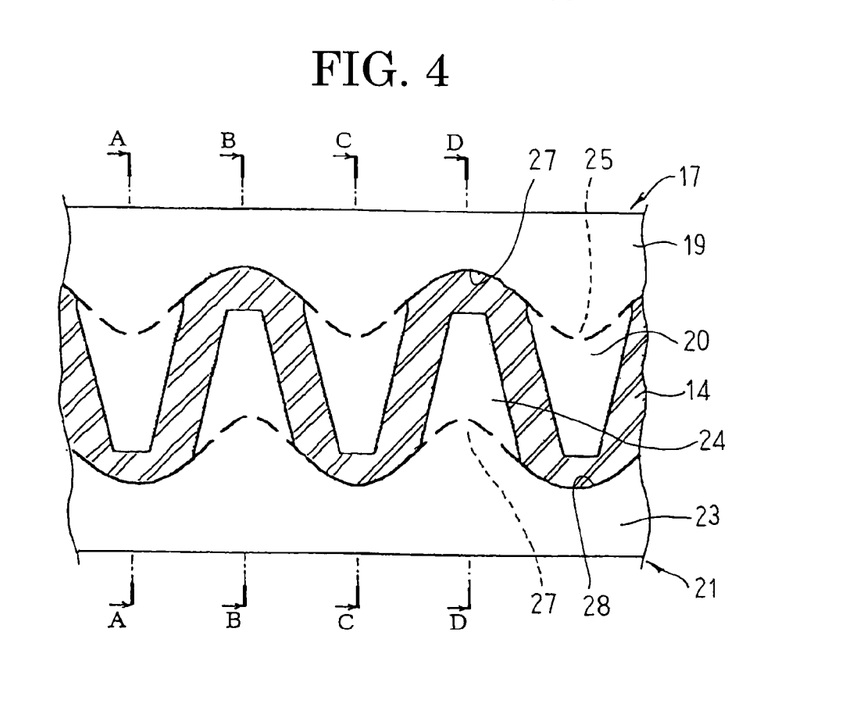
FIG. 4 is a developed projection that shows in projection a state of the rotor of the automotive generator according to Embodiment 1 of the present invention when viewed from radially outside.
Figure 5:
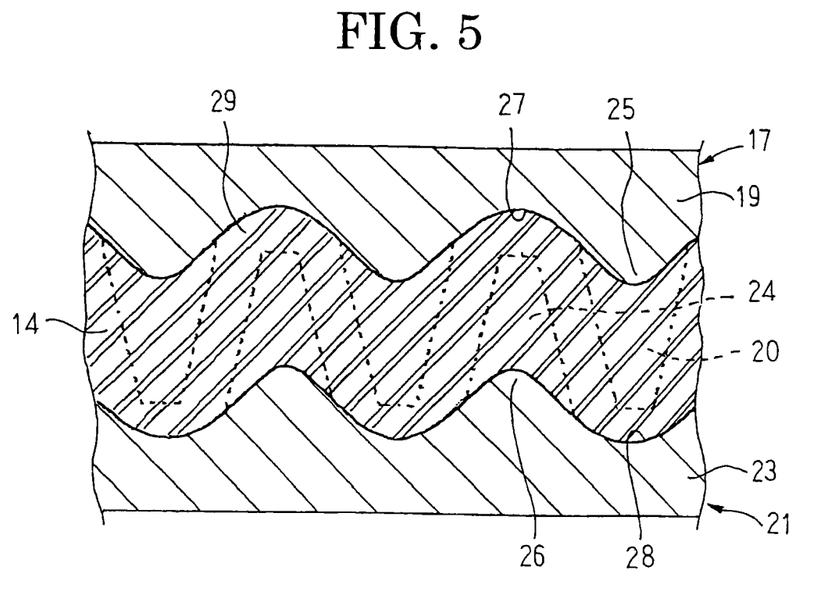
FIG. 5 is a developed projection that shows in projection the state in FIG. 4 with the claw-shaped magnetic pole portions omitted.

FIG. 1 is a cross section that schematically shows a configuration of an automotive generator according to Embodiment 1 of the present invention, FIG. 2 is a perspective that shows an assembled state of a rotor core in a rotor of the automotive generator according to Embodiment 1 of the present invention, FIG. 3 is an exploded perspective that shows the rotor core in the rotor of the automotive generator according to Embodiment 1 of the present invention, FIG. 4 is a developed projection that shows in projection a state of the rotor of the automotive generator according to Embodiment 1 of the present invention when viewed from radially outside, and FIG. 5 is a developed projection that shows in projection the state in FIG. 4 with the claw-shaped magnetic pole portions omitted.

In FIG. 1, an automotive generator 1 includes: a case 4 that is constituted by a front bracket 2 and a rear bracket 3 that are each made of aluminum so as to have an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; fans 7 that are fixed to first and second end surfaces in an axial direction of the rotor 13; a stator 10 that is fixed to the case 4 so as to surround an outer circumference of the rotor 13 so as to have a constant air gap relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted in the stator core 11, and in which an alternating current arises due to changes in magnetic flux from a field coil 14 that accompany rotation of the rotor 13. The rotor 13 includes: a field coil 14 that generates magnetic flux on passage of an excitation current; a pole core 15 that is disposed so as to cover the field coil 14 and in which magnetic poles are formed by that magnetic flux; and the shaft 16, which is fitted through a central axial position of the pole core 15.

As shown in FIGS. 2 and 3, the pole core 15 is configured so as to be divided into first and second pole core bodies 17 and 21 that are each prepared by a cold forging manufacturing method using a low carbon steel such as S10C, for example.

The first pole core body 17 has: a cylindrical first boss portion 18 through which a shaft insertion aperture is disposed at a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

Columnar first protruding portions 25 that have arc-shaped cross sections in which two ends of an arc are joined by a straight line that are prepared by a cold forging manufacturing method using a low carbon steel such as S10C, for example, are joined to inner wall surfaces of portions of the first yoke portion 19 at root portions of the respective first claw-shaped magnetic pole portions 20, radially-inner surfaces of the first claw-shaped magnetic pole portions 20, and outer circumferential surfaces of the first boss portion 18 in a magnetically linked state. In addition, first recess portions 27 that have inner wall surfaces that have inner circumferential surface shapes that are similar to outer circumferential wall surfaces of the first protruding portions 25 are recessed into inner wall surfaces of portions of the first yoke portion 19 that are positioned between first claw-shaped magnetic pole portions 20 that are circumferentially adjacent.

Similarly, the second pole core body 21 has: a cylindrical second boss portion 22 through which a shaft insertion aperture is disposed at a central axial position; a thick ring-shaped second yoke portion 23 that is disposed so as to extend radially outward from a second end edge portion of the second boss portion 22; and second claw-shaped magnetic pole portions 24 that are disposed that extend outward toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

Columnar second protruding portions 26 that have arc-shaped cross sections in which two ends of an arc are joined by a straight line that are prepared by a cold forging manufacturing method using a low carbon steel such as S10C, for example, are joined to inner wall surfaces of portions of the second yoke portion 23 at root portions of the respective second claw-shaped magnetic pole portions 24, radially-inner surfaces of the second claw-shaped magnetic pole portions 24, and outer circumferential surfaces of the second boss portion 21 in a magnetically linked state. In addition, second recess portions 28 that have inner wall surfaces that have inner circumferential surface shapes that are similar to outer circumferential wall surfaces of the second protruding portions 26 are recessed into inner wall surfaces of portions of the second yoke portion 23 that are positioned between second claw-shaped magnetic pole portions 24 that are circumferentially adjacent. Moreover, the first protruding portions 25 and the second protruding portions 26 are magnetic body parts, and have identical shapes.

The first and second pole core bodies 17 and 21 are fixed to the shaft 16 that has been pressed into the shaft insertion apertures of the first and second boss portions 18 and 22 with the first and second claw-shaped magnetic pole portions 20 and 24 facing each other so as to intermesh and with end surfaces of the first and second boss portions 18 and 22 abutted to each other.

The first protruding portions 25 and the first recess portions 27 are arranged so as to alternate circumferentially, and the second protruding portions 26 and the second recess portions 28 are arranged so as to alternate circumferentially. In addition, the first protruding portions 25 and the second recess portions 28 face each other, and the second protruding portions 26 and the first recess portions 27 face each other. Thus, as shown in FIGS. 4 through 6D, the shape of a field coil housing space 29 that is surrounded by the first and second boss portions 18 and 22, the first and second yoke portions 19 and 23, and the first and second claw-shaped magnetic pole portions 20 and 24, i.e., a region in which the field coil 14 is disposed, is configured into a wave shape in which an approximately pentagonal cross-sectional shape in a plane that includes a central axis of the pole core 15 is approximately constant in a circumferential direction and zigzags alternately in an axial direction at positions of the first and second claw-shaped magnetic pole portions 20 and 24.

Moreover, as shown in FIGS. 4 through 6D, the field coil 14 is mounted inside this field coil housing space 29 by winding a conductor wire that has a circular cross section, for example, onto a bobbin (not shown) in multiple rows in an axial direction and in multiple layers in a radial direction. Here, the field coil 14 is mounted in a wave shape in which a rectangular cross-sectional shape in the plane that includes the central axis of the pole core 15 is approximately constant in a circumferential direction and zigzags alternately in an axial direction so as to conform to an internal surface shape of the field coil housing space 29.

Next, action of an automotive generator 1 into which this rotor 13 has been incorporated will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Here, a magnetic circuit is configured in which magnetic flux enters the stator core 11 by passing through the air gap from the first claw-shaped magnetic pole portions 20, enters neighboring second claw-shaped magnetic pole portions 24 again by passing through the air gap, and flows through the second yoke portion 23, the second boss portion 22, the first boss portion 18, and the first yoke portion 19 to the first claw-shaped magnetic pole portions 20. Here, portions of the first yoke portion 19 that are positioned between circumferentially adjacent first claw-shaped magnetic pole portions 20 and portions of the second yoke portion 23 that are positioned between circumferentially adjacent second claw-shaped magnetic pole portions 24 are outside the magnetic circuit described above. Consequently, forming the first recess portions 27 on the portions of the first yoke portion 19 that are positioned between the circumferentially-adjacent first claw-shaped magnetic pole portions 20 and forming the second recess portions 28 on the portions of the second yoke portion 23 that are positioned between the circumferentially adjacent second claw-shaped magnetic pole portions 24 does not lead to any increase in magnetic resistance in the magnetic circuit described above.

Figure 6:
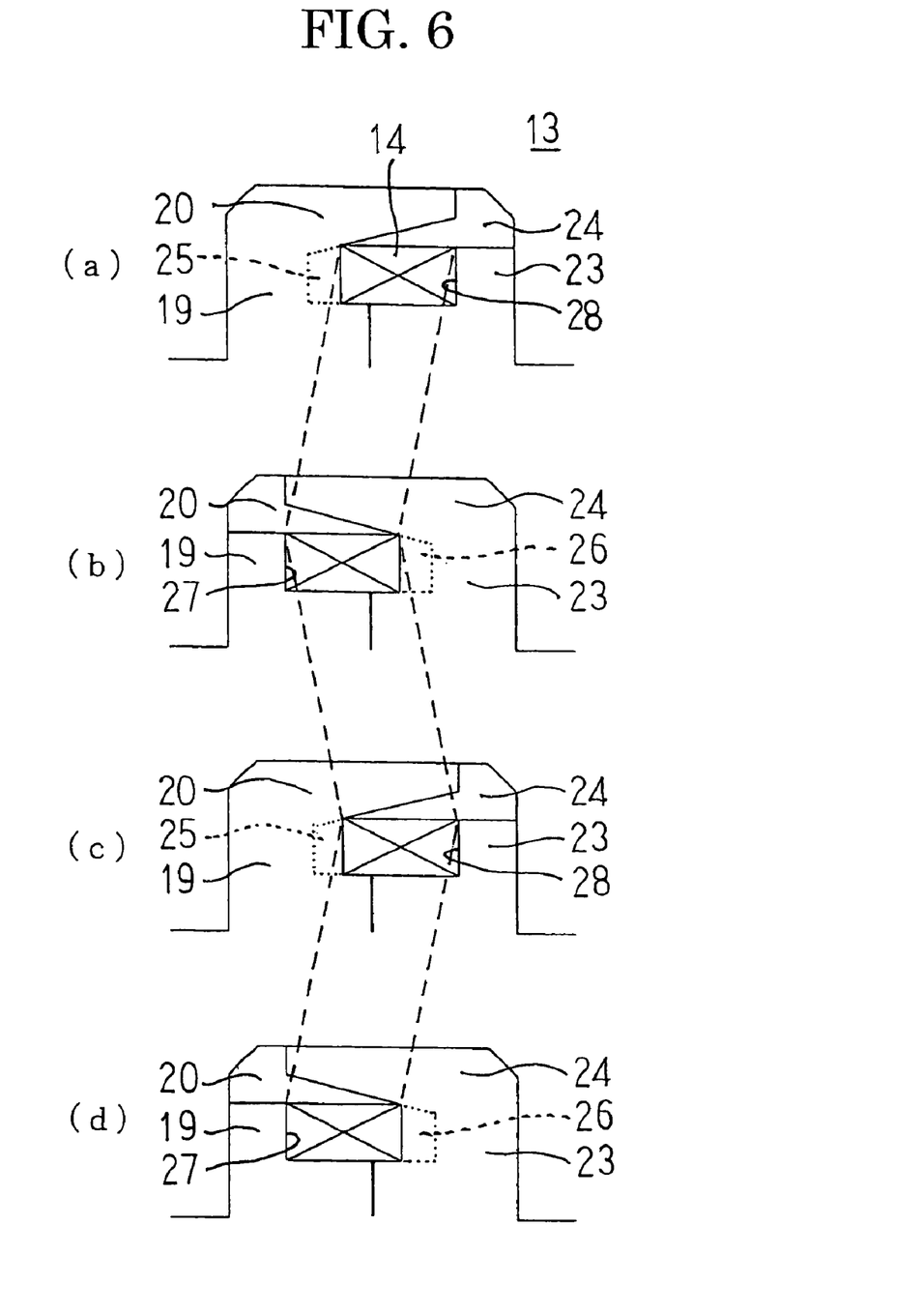
FIG. 6 is a diagram that explains a mounted state of a field coil in the rotor of the automotive generator according to Embodiment 1 of the present invention.
Figure 7:
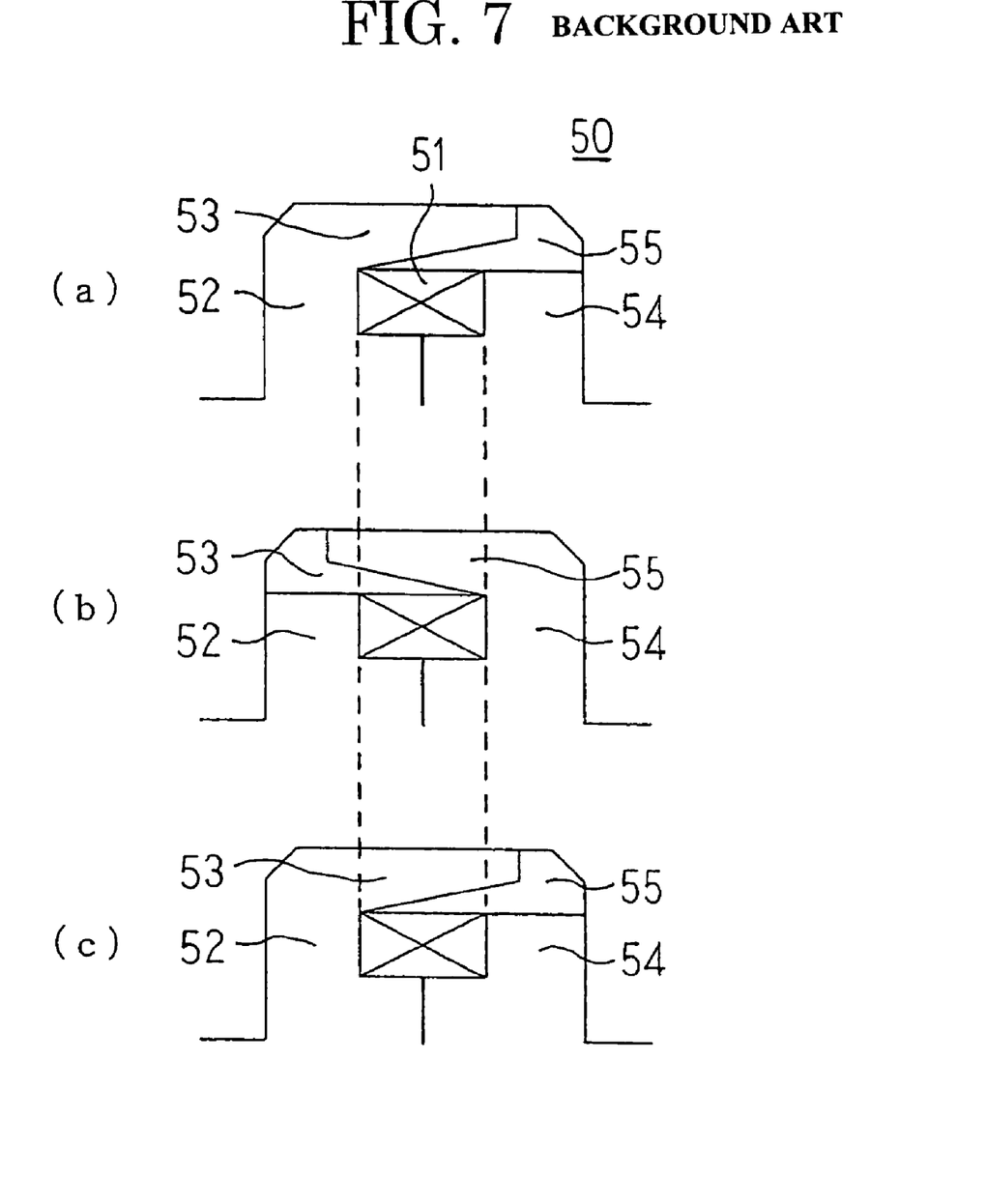
FIG. 7 is a diagram that explains a mounted state of a field coil in a rotor of a conventional automotive generator.

Next, effects of the present invention will be explained in comparison with a conventional technique. FIG. 6 is a diagram that explains a mounted state of a field coil in the rotor of the automotive generator according to Embodiment 1 of the present invention, FIG. 6(*a*) being a cross section that is taken along line A-A in FIG. 4 so as to be viewed in the direction of the arrows, FIG. 6(*b*) being a cross section that is taken along line B-B in FIG. 4 so as to be viewed in the direction of the arrows, FIG. 6(*c*) being a cross section that is taken along line C-C in FIG. 4 so as to be viewed in the direction of the arrows, and FIG. 6(*d*) being a cross section that is taken along line D-D in FIG. 4 so as to be viewed in the direction of the arrows. FIG. 7 is a diagram that explains a mounted state of a field coil in a rotor of a conventional automotive generator.

As shown in FIG. 6, this field coil 14 has a constant rectangular cross section, and is mounted in a wave shape that is alternately offset toward the second yoke portion 23 at positions below the first claw-shaped magnetic pole portions 20 and toward the first yoke portion 19 at positions below the second claw-shaped magnetic pole portions 24. Magnetic path cross-sectional area is increased at the root portions of the first claw-shaped magnetic pole portions 20 by the first yoke portion 19 and the first protruding portions 25, and magnetic path cross-sectional area is reduced at facing portions of the second yoke portion 23 by the presence of the second recess portions 28. Similarly, magnetic path cross-sectional area is increased at the root portions of the second claw-shaped magnetic pole portions 24 by the second yoke portion 23 and the second protruding portions 26, and magnetic path cross-sectional area is reduced at facing portions of the first yoke portion 19 by the presence of the first recess portions 27.

On the other hand, as shown in FIG. 7, a field coil 51 in a conventional rotor 50 has a constant rectangular cross section, and is mounted in a cylindrical shape without being offset axially. Specifically, axial thicknesses (wall thicknesses) of a first yoke portion 52 and a second yoke portion 54 are equal, and a wall thickness of the first yoke portion 52 at a root portion of a first claw-shaped magnetic pole portion 53 and a wall thickness of the second yoke portion 54 at a root portion of a second claw-shaped magnetic pole portion 55 are equal.

Thus, in this rotor 13, magnetic path cross-sectional area in the root portions where the magnetic flux flows into the first claw-shaped magnetic pole portions 20 and also magnetic path cross-sectional area in the root portions where the magnetic flux flows in from the second claw-shaped magnetic pole portions 24 can be increased compared to the conventional rotor 50. Consequently, magnetic saturation in the root portions of the first and second claw-shaped magnetic pole portions 20 and 24 can be alleviated, enabling sufficient magnetic flux to be ensured to the claw tip portion.

The first protruding portions 25 are disposed on the root portions of the first claw-shaped magnetic pole portions 20, and the second recess portions 28 are disposed on portions of the second yoke portion 23 that face the first protruding portions 25. In addition, the second protruding portions 26 are disposed on the root portions of the second claw-shaped magnetic pole portions 24, and the first recess portions 27 are disposed on portions of the first yoke portion 19 that face the second protruding portions 26. Thus, reduction in the field coil housing space 29 that results from disposing the first and second protruding portions can be avoided, enabling mounting space for the field coil 14 to be maintained.

In addition, because the first and second claw-shaped magnetic pole portions 20 and 24 are formed so as to have a tapered shape, leakage flux between circumferentially adjacent first and second claw-shaped magnetic pole portions 20 and 24 can also be reduced.

Figure 8:
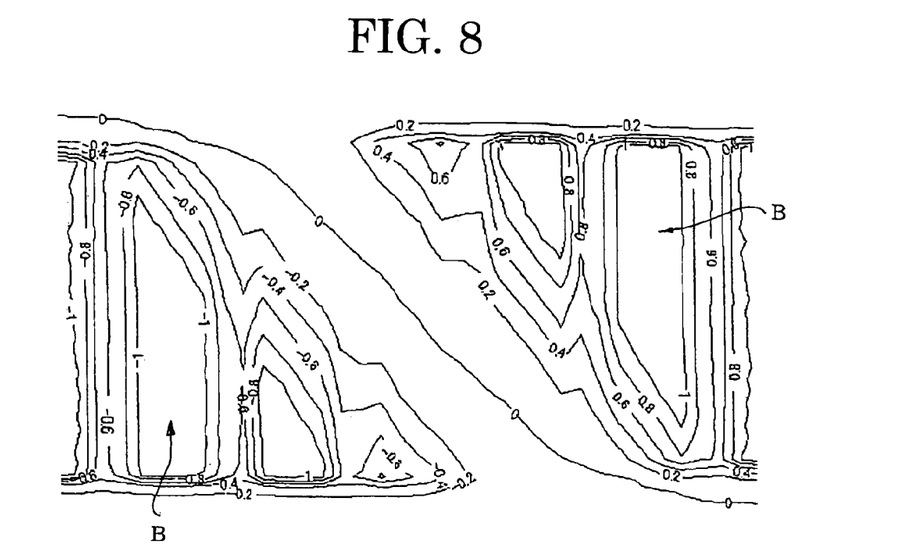
FIG. 8 is a chart that shows distribution of radial components of magnetic flux density from claw-shaped magnetic pole portions that are generated in an air gap in the automotive generator according to Embodiment 1 of the present invention.

Next, results when magnetic fields in an automotive generator that uses this rotor 13 were analyzed will be shown. FIG. 8 is a chart that shows distribution of radial components of magnetic flux density from claw-shaped magnetic pole portions that are generated in an air gap in the automotive generator according to Embodiment 1 of the present invention, and FIG. 9 is a chart that shows distribution of radial components of magnetic flux density from claw-shaped magnetic pole portions that are generated in an air gap in the conventional automotive generator.

Figure 9:
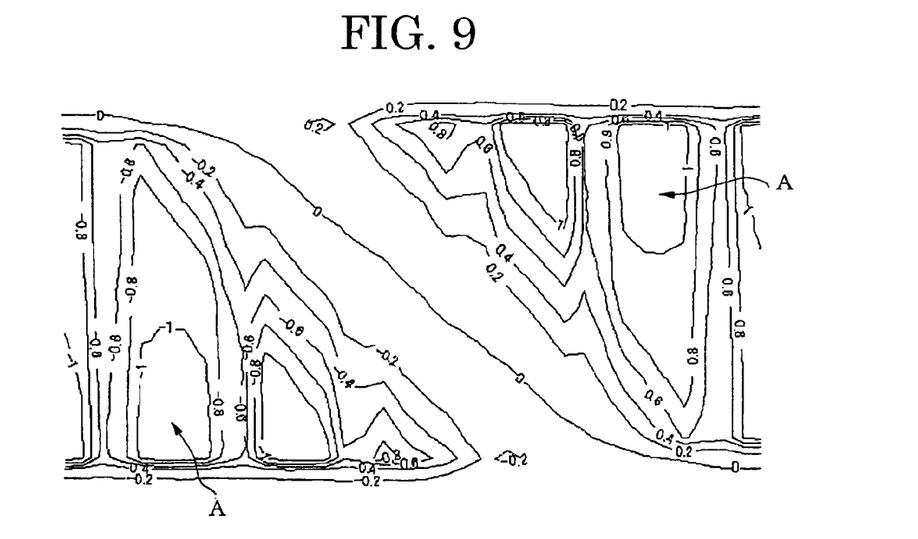
FIG. 9 is a chart that shows distribution of radial components of magnetic flux density from claw-shaped magnetic pole portions that are generated in an air gap in the conventional automotive generator.

It can be seen from FIG. 9 that regions in which air gap magnetic flux density exceeds 1 T (Regions A in FIG. 9) are formed near root ends of the claw-shaped magnetic pole portions. On the other hand, it can be seen from FIG. 8 that regions in which the air gap magnetic flux density exceeds 1 T (Regions B in FIG. 8) are increased compared to the conventional technique, and are expanded toward tip ends of the claw-shaped magnetic pole portions. In other words, it can be seen that the amount of magnetic flux at the tip end portions of the claw-shaped magnetic pole portions is improved by the present invention. Consequently, according to the present invention, the amount of magnetic flux can be increased significantly, by as much as 5 to 10 percent, compared to the conventional technique.

Conventionally, when the amount of magnetic flux is insufficient due to magnetic saturation, voltage has been ensured by increasing the number of turns in the stator coil, and the number of turns has been selected such that power generation can also be performed in the vicinity of idling. As a result, although generated power in a low-speed region is increased, inductance is increased due to increasing the number of turns as part of a design trade off, reducing the generated power in a high-speed region.

However, because magnetic saturation is alleviated in the present invention by increasing the magnetic path cross-sectional area in the root portions of the claw-shaped magnetic pole portions, the insufficient amount of magnetic flux that has been a problem conventionally can be avoided. Thus, sufficient generated power is also ensured in the vicinity of idling, enabling the number of turns to be reduced. Thus, generated power can also be increased in the high-speed region as well as in the low-speed region.

In Embodiment 1, because first and second protruding portions 25 and 26 that constitute magnetic body parts that are prepared using separate parts from the first and second pole core bodies 17 and 21 are joined together with the first and second pole core bodies 17 and 21 in a magnetically linked state, pole cores can be prepared easily compared to when pole core bodies on which protruding portions and recess portions are formed are prepared integrally using a cold forging manufacturing method.

Embodiment 2

Figure 10:
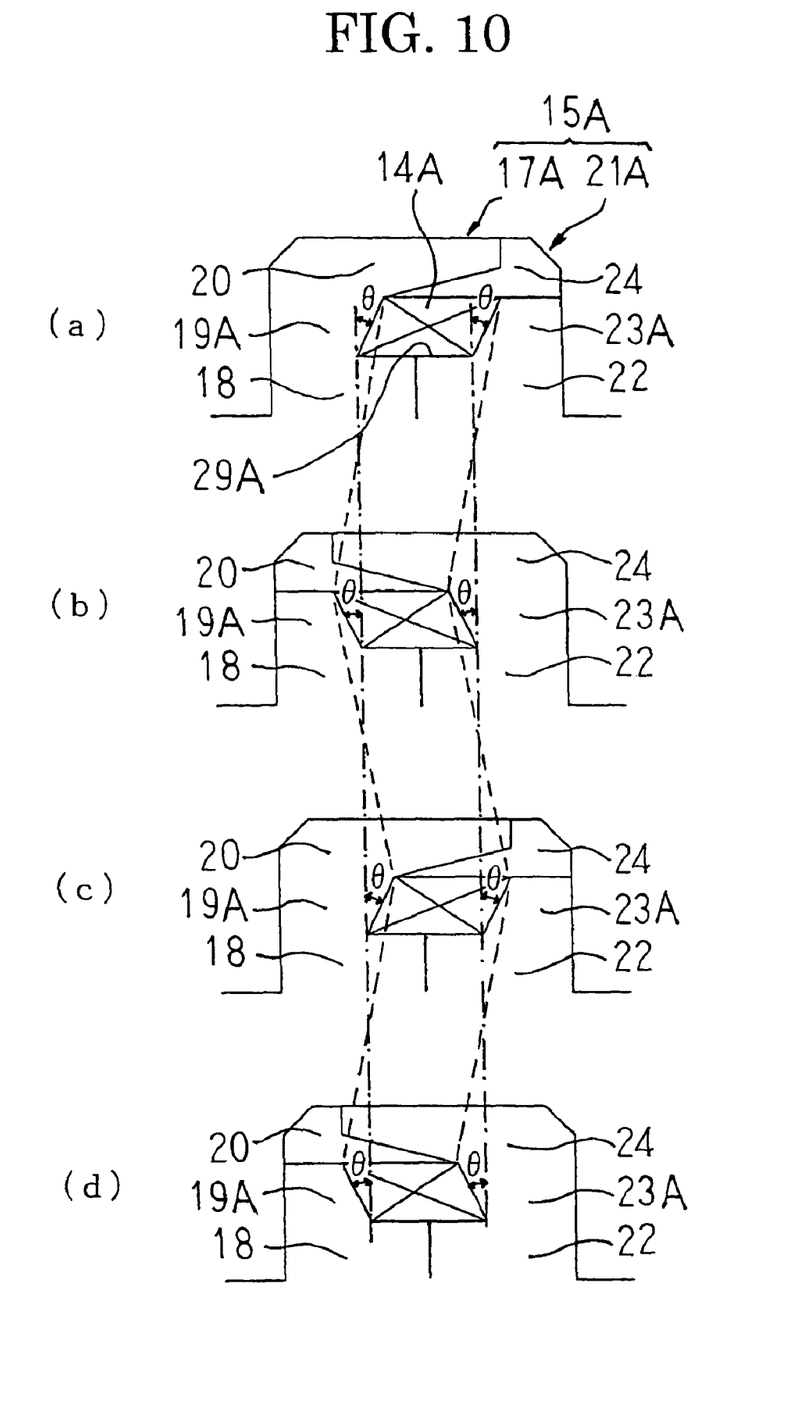
FIG. 10 is a diagram that explains a mounted state of a field coil in a rotor of an automotive generator according to Embodiment 2 of the present invention.
Figure 11:
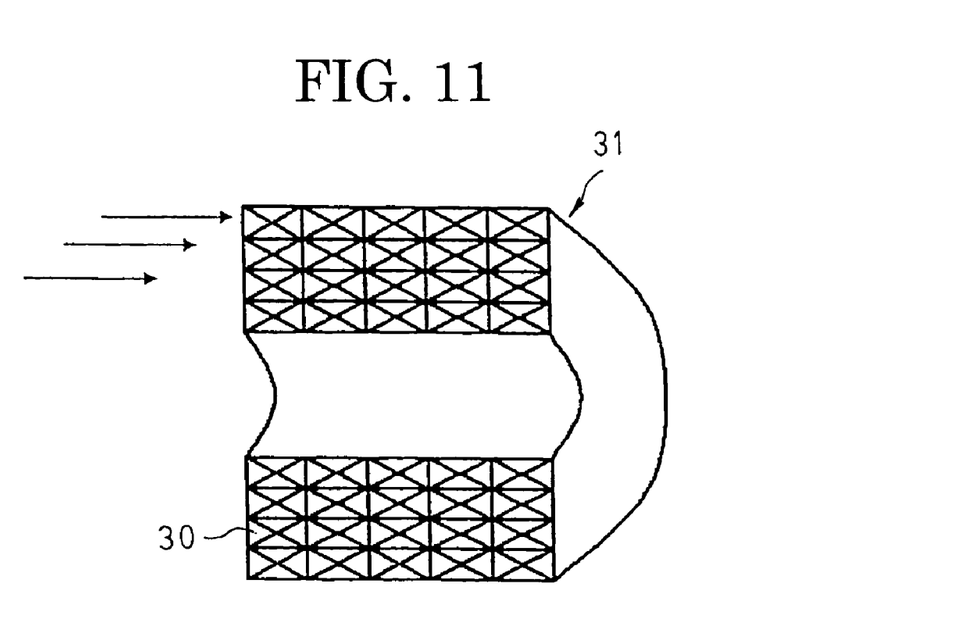
FIG. 11 is a diagram that explains a method for preparing the field coil in the rotor of the automotive generator according to Embodiment 2 of the present invention.
Figure 12:
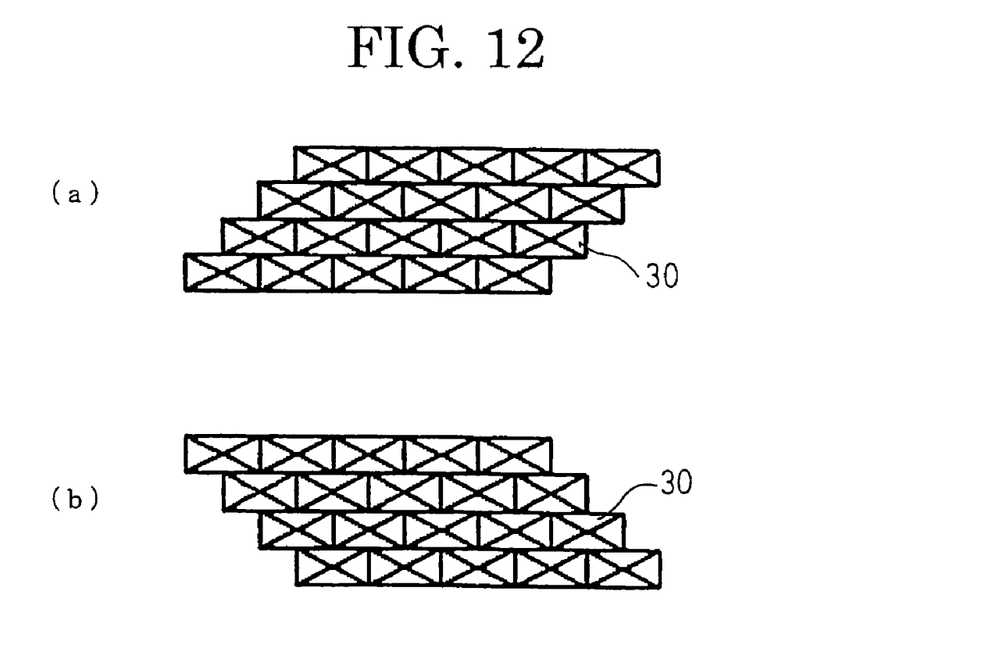
FIG. 12 is a diagram that explains a cross-sectional shape of the field coil in the rotor of the automotive generator according to Embodiment 2 of the present invention.

FIG. 10 is a diagram that explains a mounted state of a field coil in a rotor of an automotive generator according to Embodiment 2 of the present invention, FIG. 11 is a diagram that explains a method for preparing the field coil in the rotor of the automotive generator according to Embodiment 2 of the present invention, and FIG. 12 is a diagram that explains a cross-sectional shape of the field coil in the rotor of the automotive generator according to Embodiment 2 of the present invention, FIG. 12(*a*) showing the cross-sectional shape of the field coil at a position below a first claw-shaped magnetic pole portion, and FIG. 12(*b*) showing the cross-sectional shape of the field coil at a position below a second claw-shaped magnetic pole portion.

As shown in FIG. 10, a pole core 15A is configured so as to be divided into first and second pole core bodies 17A and 21A that are each prepared by a cold forging manufacturing method using a low carbon steel such as S10C, for example.

The first pole core body 17A has: a cylindrical first boss portion 18 through which a shaft insertion aperture is disposed at a central axial position; a ring-shaped first yoke portion 19A that is disposed so as to extend radially outward from a first end edge portion of the first boss portion 18; and first claw-shaped magnetic pole portions 20 that are disposed so as to extend toward a second axial end from outer circumferential portions of the first yoke portion 19A. An inner wall surface of the first yoke portion 19A is formed such that an angle $\theta$ that is formed between the inner wall surface of the first yoke portion 19A and a radial direction in a plane that includes a central axis of the first pole core body 17A is at a maximum on an inner side at a circumferentially central position of each of the first claw-shaped magnetic pole portions 20 (near the second pole core body 21A), and is at a maximum on an outer side at a circumferentially central position between circumferentially adjacent first claw-shaped magnetic pole portions 20 (away from the second pole core body 21A). The inner wall surface of the first yoke portion 19A intersects an outer circumferential wall surface of the first boss portion 18 at identical positions in an axial direction. In addition, a radially outermost edge portion of the inner wall surface of the first yoke portion 19A is formed in a wave shape in which arcs that form convexes at root portions of the first claw-shaped magnetic pole portions 20 and arcs that form concaves between the circumferentially adjacent first claw-shaped magnetic pole portions 20 are linked.

The second pole core body 21A has: a cylindrical second boss portion 22 through which a shaft insertion aperture is disposed at a central axial position; a ring-shaped second yoke portion 23A that is disposed so as to extend radially outward from a second end edge portion of the second boss portion 22; and second claw-shaped magnetic pole portions 24 that are disposed that extend outward toward a first axial end from outer circumferential portions of the second yoke portion 23A. An inner wall surface of the second yoke portion 23A is formed such that an angle θ that is formed between the inner wall surface of the second yoke portion 23A and a radial direction in a plane that includes a central axis of the second pole core body 21A is at a maximum on an inner side at a circumferentially central position of each of the second claw-shaped magnetic pole portions 24 (near the first pole core body 17A), and is at a maximum on an outer side at a circumferentially central position between circumferentially adjacent second claw-shaped magnetic pole portions 24 (away from the first pole core body 17A). The inner wall surface of the second yoke portion 23A intersects an outer circumferential wall surface of the second boss portion 22 at identical positions in an axial direction. In addition, a radially outermost edge portion of the inner wall surface of the second yoke portion 23A is formed in a wave shape in which arcs that form convexes at root portions of the second claw-shaped magnetic pole portions 24 and arcs that form concaves between the circumferentially adjacent second claw-shaped magnetic pole portions 24 are linked.

Thus, when the first and second pole core bodies 17A and 21A have been fitted together, a field coil housing space 29A that is surrounded by the first and second boss portions 18 and 22, the first and second yoke portions 19A and 23A, and the first and second claw-shaped magnetic pole portions 20 and 24 is configured so as to have an approximately pentagonal cross-sectional shape in a plane that includes a central axis of the pole core 15A such that two sides of the cross-sectional shape that face each other in an axial direction are parallel to each other, an axial distance between those sides is approximately constant in a circumferential direction, and the sides are inclined in a reverse direction at each of the first and second claw-shaped magnetic pole portions 20 and 24, i.e., at each of the poles. A field coil 14A is mounted inside this field coil housing space 29A.

Now, a conductor wire that has a circular cross section is generally used for the field coil, but a conductor wire 30 that has a flat rectangular cross section is used in Embodiment 2.

First, a cylindrical coil body 31 that is shown in FIG. 11 is prepared by winding the conductor wire 30 that has a flat rectangular cross section in multiple rows in an axial direction and in multiple layers in a radial direction. Next, the cross section of the coil body 31 is deformed into a parallelogram by pressing the coil body 31 from an axial direction as indicated by arrows in FIG. 11 to slide the conductor wire 30 in each layer axially. In reality, because a direction of inclination of sides of the parallelogram changes at every pole as shown in FIGS. 12A and 12B, the coil body 31 must be pressed alternately from two axial ends.

The coil body 31 that has been deformed into a parallelogrammatic cross section is mounted onto the first boss portion 18 of the first pole core body 17A, for example. Next, a rotor is assembled by fitting the first pole core body 17A and the second pole core body 21A together, and press-fitting a shaft 16 into the shaft insertion apertures of the first and second boss portions 18 and 22.

In Embodiment 2, an angle θ that is formed between the inner wall surface of the first yoke portion 19A and a radial direction in a plane that includes a central axis of the first pole core body 17A is at a maximum on an inner side at a circumferentially central position of each of the first claw-shaped magnetic pole portions 20 (near the second pole core body 21A), and an angle θ that is formed between the inner wall surface of the second yoke portion 23A and a radial direction in a plane that includes a central axis of the second pole core body 21A is at a maximum on an inner side at a circumferentially central position of each of the second claw-shaped magnetic pole portions 24 (near the first pole core body 17A). Thus, magnetic path cross-sectional area in the root portions where the magnetic flux flows into the first claw-shaped magnetic pole portions 20 and also magnetic path cross-sectional area in the root portions where the magnetic flux flows in from the second claw-shaped magnetic pole portions 24 can be increased, enabling magnetic saturation in the root portions of the first and second claw-shaped magnetic pole portions 20 and 24 to be alleviated, and enabling sufficient magnetic flux to be ensured to the claw tip portion.

Because the field coil housing space 29A is configured so as to have an approximately pentagonal cross-sectional shape in a plane that includes a central axis of the pole core 15A such that two sides of the cross-sectional shape that face each other in an axial direction are parallel to each other, an axial distance between those sides is approximately constant in a circumferential direction, and the sides are inclined in a reverse direction at each of the first and second claw-shaped magnetic pole portions 20 and 24, i.e., at each of the poles, mounting space for the field coil 14A can be maintained.

Because a conductor wire 30 that has a flat rectangular cross section is used, the field coil 14A can be prepared by winding the conductor wire 30 that has a flat rectangular cross section in multiple rows in an axial direction and in multiple layers in a radial direction without gaps. Thus, space factor can be increased in this field coil 14A compared with field coils that are obtained by winding a conductor wire that has a circular cross section in multiple rows and multiple layers in a hexagonal stacking pattern.

Because a conductor wire 30 that has a flat rectangular cross section is used, a coil body 31 into which the conductor wire 30 is wound in a cylindrical shape can easily be deformed into a parallelogrammatic cross section by pressing from an axial direction. Thus, a bobbin that has a complex shape is no longer necessary, and producibility of the field coil 14A can also be improved.

Moreover, in Embodiment 2 above, the field coil housing space 29A described above may also be prepared in a similar manner to Embodiment 1 above by preparing protruding portions that function as magnetic body parts as separate parts, and joining the protruding portions to the root portions of the first and second claw-shaped magnetic pole portions 20 and 24 in a magnetically linked state.

In Embodiment 1 above, the field coil 14 is prepared using a conductor wire that has a circular cross section, but the field coil 14 may also be prepared using a conductor wire that has a flat rectangular cross section.

In each of the above embodiments, the boss portions are prepared so as to have cylindrical shapes, but the boss portions are not limited to having cylindrical shapes, and may also have angular prismatic shapes, for example.

In each of the above embodiments, the pole cores are divided into two sections, i.e., the first and second pole core bodies, but the pole cores are not necessarily limited to being configured in two sections, and may also be configured in three sections that are divided at inner circumferential root portions of the first and second yoke portions of the pole cores in planes that are perpendicular to the central axis, for example.

What is claimed is:

1. A rotor for an automotive generator, comprising:
   a pole core, including:
      a columnar boss portion;
      a pair of yoke portions that are disposed so as to extend radially outward from two axial end edge portions of said boss portion; and
      a plurality of claw-shaped magnetic pole portions that are disposed so as to extend axially from each of said pair of yoke portions, and that intermesh with each other,
      said pole core being fixed to a shaft that is inserted through a central axial position of said boss portion; and
   a field coil that is housed inside a field coil housing space that is surrounded by said boss portion, said pair of yoke portions, and said claw-shaped magnetic pole portions, wherein
   protruding portions are disposed so as to project from inner wall surfaces of portions of said yoke portions at root portions of each of said claw-shaped magnetic pole portions, and recess portions are recessed into inner wall surfaces of portions of said yoke portions that face said protruding portions, and
   a shape of a region in which said field coil is disposed is configured into a wave shape that shifts in an axial direction that has a cross-sectional shape in a plane that includes a central axis of said pole core that is approximately constant in a circumferential direction and that zigzags alternately in the axial direction at positions of each of said claw-shaped magnetic pole portions.

2. The rotor according to claim 1, further comprising:
   a plurality of magnetic body parts each having an arc shaped cross section, wherein
   said protruding portions are formed by joining said magnetic body parts to said pole core in a magnetically linked state.

3. The rotor according to claim 1, wherein said field coil is configured by winding a conductor wire, the conductor wire having a flat, rectangular shape, into said field coil housing space in multiple rows in the axial direction and in multiple layers in a radial direction.

4. A rotor for an automotive generator, comprising:
   a pole core, including:
      a columnar boss portion;
      a pair of yoke portions that are disposed so as to extend radially outward from two axial end edge portions of said boss portion; and
      a plurality of claw-shaped magnetic pole portions that are disposed so as to extend axially from each of said pair of yoke portions, and that intermesh with each other,
      said pole core being fixed to a shaft that is inserted through a central axial position of said boss portion; and
   a field coil that is housed inside a field coil housing space that is surrounded by said boss portion, said pair of yoke portions, and said claw-shaped magnetic pole portions, wherein
   protruding portions are disposed so as to project from inner wall surfaces of portions of said yoke portions at root portions of each of said claw-shaped magnetic pole portions, and recess portions are recessed into inner wall surfaces of portions of said yoke portions that face said protruding portions, and
   a shape of a region in which said field coil is disposed is configured such that two sides that constitute a cross-sectional shape in a plane that includes a central axis of said pole core and that face each other in an axial direction are parallel to each other, an axial distance between said sides is approximately constant in a circumferential direction, and said sides are inclined alternately in a reverse direction at each magnetic pole.

5. The rotor according to claim 4, further comprising
   a plurality of magnetic body parts each having an arc shaped cross section, wherein
   said protruding portions are formed by joining said magnetic body parts to said pole core in a magnetically linked state.

6. The rotor according to claim 4, wherein said field coil is configured by winding a conductor wire, the conductor wire having a flat, rectangular shape into said field coil housing space in multiple rows in an axial direction and in multiple layers in a radial direction.

* * * * *